United States Patent
Edelmann et al.

[11] Patent Number: 6,123,338
[45] Date of Patent: Sep. 26, 2000

[54] RADIAL SEAL FOR BALL BEARING

[75] Inventors: Ludwig Edelmann, Sulzthal; Andreas Geyer, Unterspiesheim; Hermann Glöckner; Holger Kristandt, both of Schweinfurt; Uwe Mayer, Münnerstadt; Henryk Velde, Werneck; Lothar Walter, Schweinfurt, all of Germany

[73] Assignee: SKF Linearsysteme GmbH, Schweinfurt, Germany

[21] Appl. No.: 09/019,779

[22] Filed: Feb. 6, 1998

[30] Foreign Application Priority Data

| Feb. 7, 1997 | [DE] | Germany | 197 04 630 |
| Aug. 28, 1999 | [DE] | Germany | 198 49 679 |
| Sep. 27, 1999 | [DE] | Germany | 198 49 681 |

[51] Int. Cl.$^7$ .............. F16J 15/32; F16C 29/06
[52] U.S. Cl. ............... 277/551; 277/562; 277/574; 384/43
[58] Field of Search .............. 277/551, 562, 277/565, 574, 576, 577, 649; 384/15, 16, 43

[56] References Cited

U.S. PATENT DOCUMENTS

| Re. 24,478 | 5/1958 | Kilbourne, Jr. | 277/649 X |
| 323,731 | 8/1885 | Phillips | 277/649 |
| 2,402,114 | 6/1946 | Le Clair | 277/577 |
| 3,357,754 | 12/1967 | Betrix | 384/43 |
| 3,472,523 | 10/1969 | Rentschler et al. | 277/649 |
| 3,909,019 | 9/1975 | Leko | 277/649 |
| 4,123,121 | 10/1978 | Ernst et al. | 384/43 |
| 4,130,286 | 12/1978 | Ernst et al. | 384/43 X |
| 4,181,374 | 1/1980 | Ernst et al. | 384/43 |
| 4,311,348 | 1/1982 | Olschewski et al. | 384/43 |
| 4,324,438 | 4/1982 | Lister | 384/16 |
| 4,357,056 | 11/1982 | Olschewski et al. | 384/43 |
| 4,411,478 | 10/1983 | Olschewski et al. | 384/15 |
| 4,421,329 | 12/1983 | Jelinek | 277/565 X |
| 4,750,748 | 6/1988 | Visser | 277/577 X |
| 5,145,260 | 9/1992 | Edelmann et al. | 384/43 |
| 5,238,136 | 8/1993 | Kasugai et al. | 277/649 X |
| 5,509,670 | 4/1996 | Wheeler | 277/565 |
| 5,511,886 | 4/1996 | Sink . | |

FOREIGN PATENT DOCUMENTS

| 155468 | 9/1985 | European Pat. Off. . |
| 509729 | 4/1992 | European Pat. Off. . |
| 2260022 | 8/1975 | France . |
| 1208563 | 1/1966 | Germany . |
| 7004483 | 2/1970 | Germany . |
| 28 30 400 | 11/1982 | Germany . |
| 3937584 | 5/1991 | Germany . |
| 4124341 | 1/1993 | Germany . |
| 195 32 085 | 3/1997 | Germany . |
| 506 248 | 12/1954 | Italy . |
| 54-69641 | 6/1979 | Japan . |
| 1153987 | 6/1966 | United Kingdom . |
| 1486737 | 9/1977 | United Kingdom . |
| 2016095 | 2/1979 | United Kingdom . |
| 2026103 | 1/1980 | United Kingdom . |

*Primary Examiner*—Anthony Knight
*Assistant Examiner*—Vishal Patel
*Attorney, Agent, or Firm*—Burns, Doane, Swecker & Mathis, L.L.P.

[57] ABSTRACT

A radial seal useful in linear ball bearings and designed to be secured during transportation as well as during operation of the bearing includes an arcuate disk portion having opposite sides. An arcuate projection is provided on each side of the disk portion, at least one of which is axially oriented. The projections are designed to have different diameters. This produces a stepped seating surface along the outside diameter of the radial seal that effects a reliable seating of the radial seal in the linear ball bearing. The radial seal can also be designed with two axially oriented projections disposed at different diameters on one side of the disk portion for projecting into an annular groove on the frontal face of the outer ring of the linear ball bearing. By constructing the projections with circumferential outer faces that slightly diverge in a cone-shaped manner, the projections further inhibit the seal from falling out of the groove.

26 Claims, 5 Drawing Sheets

RADIAL SEAL FOR BALL BEARING

This application claims priority under 35 U.S.C. §119 to German Application No. P 197 04 630.4 filed on Feb. 2, 1997, the entire content of which is incorporated herein by reference.

FIELD OF THE INVENTION

The present invention generally relates to a radial seal. More particularly, the present invention pertains to a radial seal used in linear ball bearings.

BACKGROUND OF THE INVENTION

A seal used in ball bearings is disclosed in German Patentschrift No. 28 30 400. The construction of this seal is susceptible of certain problems and drawbacks in that the seal can easily fall from its securing groove during transportation as well as during operation. This is particularly true when the seal is used in so-called "open" linear bearings. In "open" linear bearings, the bearing is provided with an axially extending slit through which the support elements of the shaft are adapted to extend.

SUMMARY OF THE INVENTION

In light of the foregoing, a need exists for a radial seal which is not susceptible to becoming dislodged from its mounting position during transportation or usage.

In one respect, the present invention ensures a relatively perfect seat for the radial seal by arranging an annular projection on both sides of an arcuate disk portion. At least one of the projections is axially oriented and the projections are positioned so as to have different diameters. This creates a stepped seating surface along the outside diameter of the radial seal that effects a reliable seating of the radial seal in the linear ball bearing.

According to another aspect of the invention, two axially oriented and concentrically positioned projections are disposed at different diameters on one side of the arcuate disk portion. These two projections are adapted to project into an annular groove integrated on the frontal face of the outer ring of the linear ball bearing. By constructing the projections with circumferential outer faces that slightly diverge in a cone-shaped manner, the projections act like a snap and further inhibit the seal from falling out of the groove in the outer ring of the linear ball bearing.

The seal is further inhibited from becoming dislodged from the groove in the outer ring by designing the disk portion so that it projects radially outwardly beyond the radially outermost projections, thereby forming a retaining projection.

The disk portion can also be provided at its radial inner edge with a seal, in particular optionally with a contactless or a contacting seal. The contactless seal can be formed by a radially oriented, annular projection that surrounds the shaft with radial clearance. The contacting seal can be formed by one or more essentially radially oriented sealing lips.

According to additional aspects of the present invention, the disk portion and the axially oriented projections can be produced in one piece from a material having a relatively lower elasticity, for example polyamide or polypropylene, with or without fiberglass reinforcement. When sealing lips are provided, these sealing lips can be fabricated of a low-friction material having a higher elasticity, for example polyurethane or thermoplastic elastomer (TPE). These sealing lips can preferably be injected. It is useful that the spaces between the axially oriented projections disposed on one side of the disk portion also be injected with this low-friction material having a higher elasticity to increase the sealing effect. To ensure better adhesion of the injected material, axial openings or bores can also be provided in an appropriate manner in the disk portion. The injected material would then be able to project into or extend through these axial openings or bores.

While the linear ball bearing can surround the shaft along the entire circumference, there are also applications in which so-called "open" designs are used. In these cases, the seals, instead of consisting of annular, closed parts (i.e., an annular disk portion, axially oriented annular projections, annular sealing lips), can take the form of annular segments which together define annular parts.

According to one aspect of the invention, a linear ball bearing includes an outer ring provided with a seal receiving groove, and a radial seal positioned within the seal receiving groove in the outer ring. The radial seal includes an arcuate disk portion having opposite sides, an arcuate projection provided on one side of the disk portion, and an arcuate projection provided on the opposite side of the disk portion. At least one of the projections is axially oriented, and one of the projections is located radially outwardly of the other projection.

Another aspect of the invention involves a radial seal positionable in a groove in a linear ball bearing mounted on a shaft. The radial seal includes an arcuate disk portion, at least one axially extending arcuate projection provided on one side of the disk portion, and at least one axially extending arcuate projection provided on the opposite side of the disk portion. The projection on the opposite side of the disk portion is positioned radially outwardly of the projection on the one side of the disk portion.

A further aspect of the invention involves a radial seal positionable in a groove in a linear ball bearing mounted on a shaft, wherein the radial seal includes an arcuate disk portion and two axially extending arcuate projections provided on one side of the disk portion. The two projections are spaced apart so that one of the projections is located radially outwardly of the other projection. Each of the two projections has an outer circumferential face, with the outer circumferential faces of the two projections diverging away from one another.

BRIEF DESCRIPTION OF THE DRAWING FIGURES

The foregoing and additional features of the present invention will become more readily apparent from the following detailed description considered with reference to the accompanying drawing figures in which like elements are designated by like reference numerals and wherein.

DETAILED DESCRIPTION OF THE INVENTION

Figure 1:
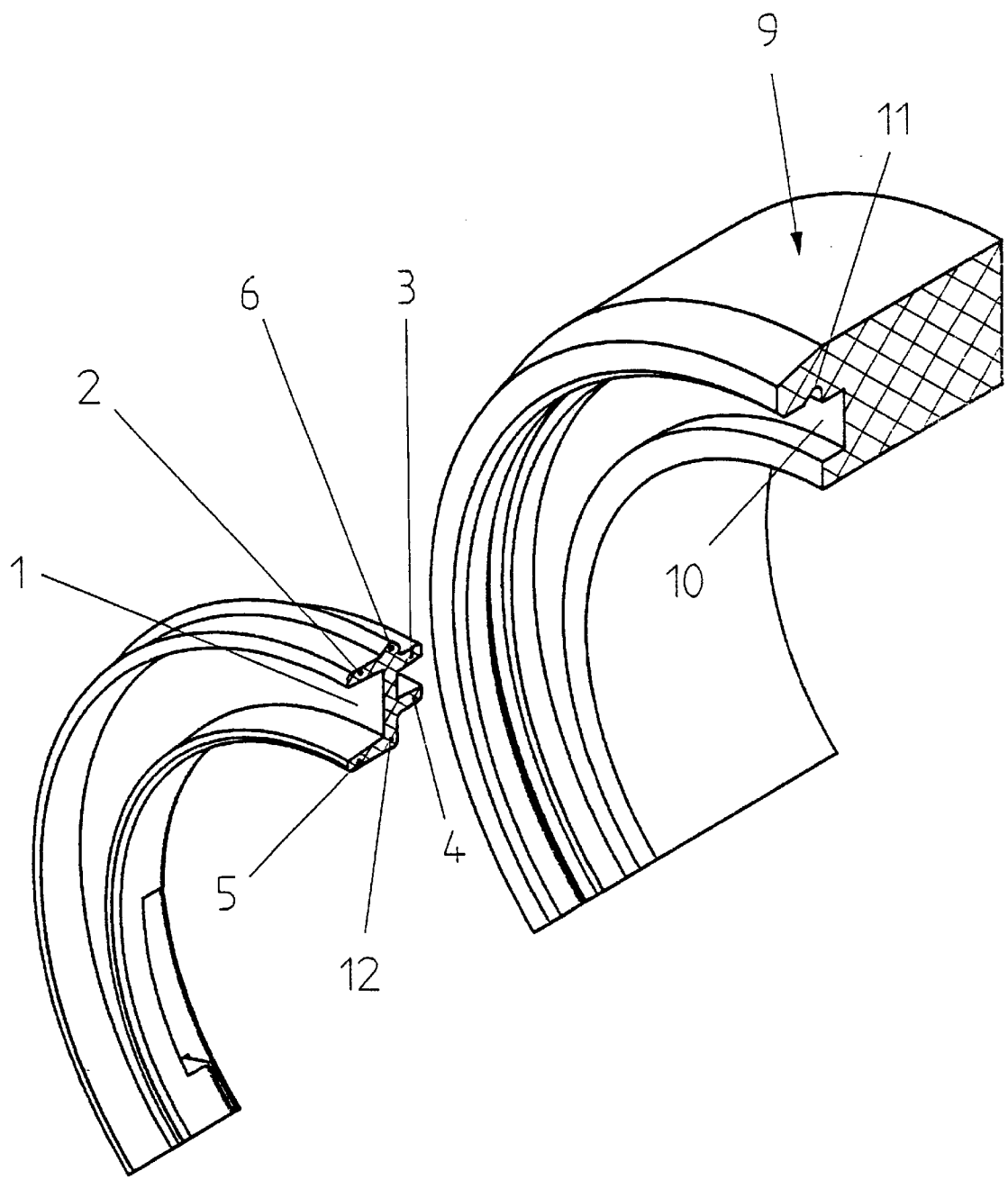
FIG. 1 is an exploded view of a portion of a contactless radial seal and closed linear ball bearing in accordance with the present invention prior to assembly.
Figure 2:
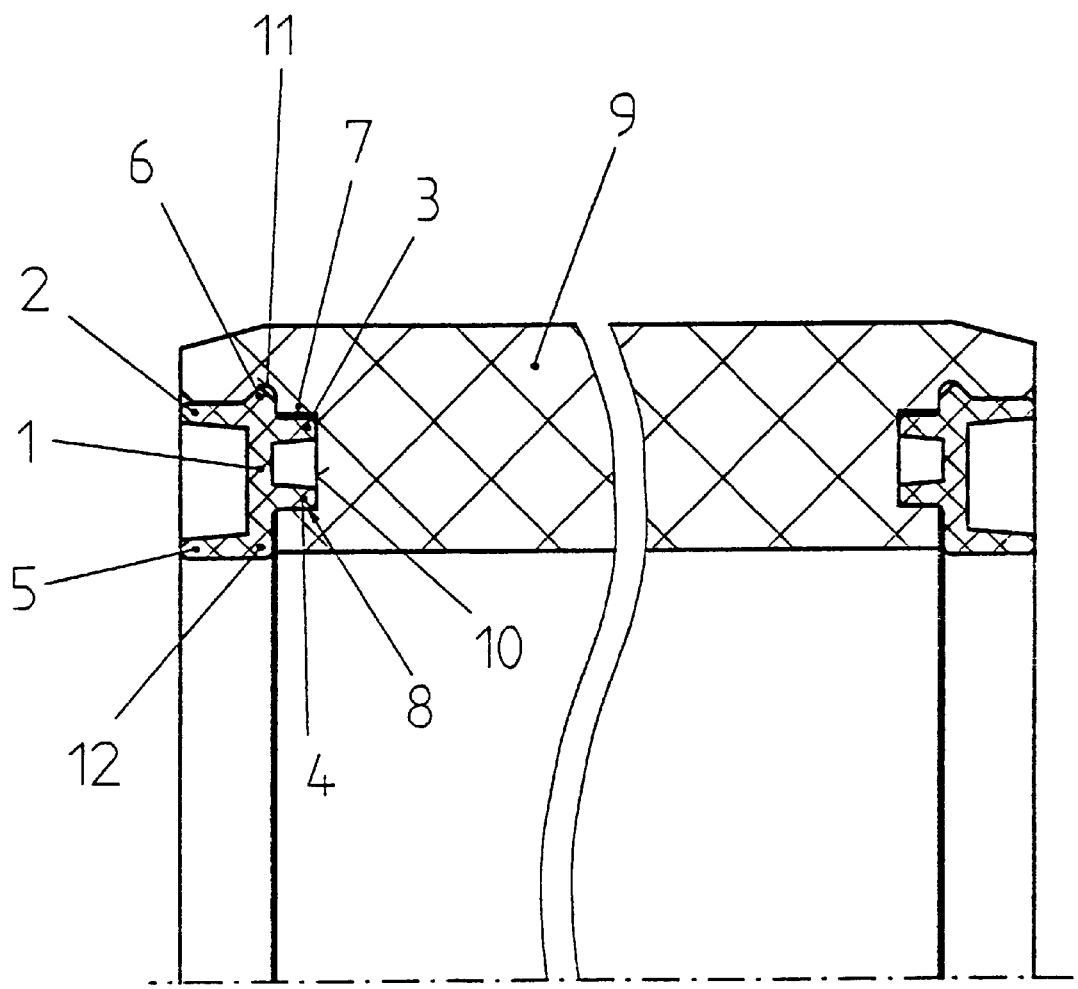
FIG. 2 is a cross-sectional view of a portion of the contactless radial seal and closed linear ball bearing shown in FIG. 1 after assembly.

With reference to FIGS. 1 and 2, the radial seal according to the present invention for use in a closed linear ball bearing is comprised of an annular disk portion 1 provided with axially extending annular or arcuate projections 2, 3, 4, 5. The axially oriented projections 2, 3, 4, 5 are concentrically arranged. The projections 2, 5 are spaced apart from one another and extend axially from one side of the disk portion 1, while the other projections 3, 4 are spaced apart from one another and extend axially from the opposite side of the disk portion 1.

As can be seen from FIGS. 1 and 2, the projections 2, 3, 4, 5 each possess different diameters or different radii of curvature and are thus located at different radial distances from the axial and radial center of the disk portion 1. The projection 2 is positioned radially outwardly of the projections 3, 4, 5, the projection 3 is positioned radially outwardly of the projections 4, 5, and the projection 4 is positioned radially outwardly of the projection 5. Thus, the projection 2 possesses the largest diameter, the projection 5 possesses the smallest diameter, and the projections 3, 4 possess a diameter greater than the diameter of the projection 5 but less than the diameter of the projection 2. Also, the diameter of the projection 3 is larger than the diameter of the projection 4.

The outer circumferential part of the disk portion 1 projects radially outwardly beyond the radially outermost projections 2, 3 to form a retaining projection 6. The retaining projection 6 thus extends outwardly in the radial direction.

The radial seal of the present invention is designed to be installed in a groove 10 formed in the front face of the outer ring 9 of a closed linear ball bearing. The groove 10 in the outer ring 9 of the linear ball bearing is defined by a radially inwardly located wall, a radially outwardly located wall, and a bottom wall extending between the radially inwardly located wall and the radially outwardly located wall. An annular or arcuate groove 11 is formed in the radially outwardly located wall defining a portion of the groove 10.

The projections 3, 4 on the securing side of the seal are provided with respective circumferential faces 7, 8 that diverge slightly outwardly in a conical shape in the direction extending away from the disk portion 1. These diverging circumferential faces 7, 8 project, after assembly, with a radial retention force into the groove 10 that is provided on the front face of the outer ring 9 of the linear ball bearing. Also, with the radial seal in the installed state, the retention projection 6 is fixed in the groove 11 of the outer ring 9. By virtue of this construction, the radial seal is reliably fixed in place within the outer ring 9.

To effect the actual sealing, the projection 5 which is provided at the radial inside edge 12 of the disk portion 1 surrounds the shaft on which the linear ball bearing is moved back and forth with a slight amount of clearance. It can thus be seen from FIG. 2 that the radial inside circumferential face of the projection 5 can be positioned slightly radially inwardly of the radial inside circumferential face of the outer ring 9.

The disk portion 1 and the axially extending projections 2, 3, 4, 5 are produced in one piece from a material having a relatively lower elasticity, for example polyamide or polypropylene, with or without fiberglass reinforcement.

Figure 5:
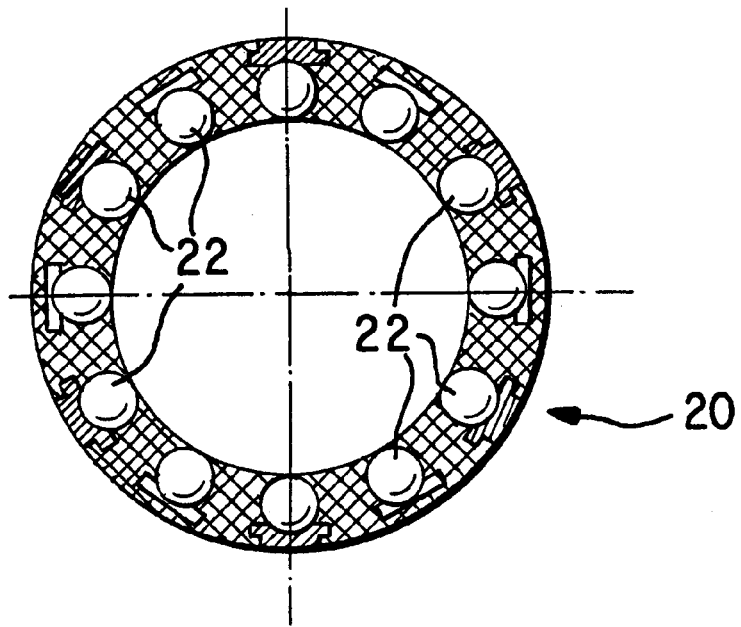
FIG. 5 is a cross-sectional view of an example of a closed linear ball bearing with which the radial seal of the present invention can be utilized.

FIG. 5 illustrates an example of a closed linear ball bearing 20 with which the seal shown in FIGS. 1 and 2 can be used. FIG. 5 depicts the linear arrangement of balls 22 within the outer ring.

Figure 3:
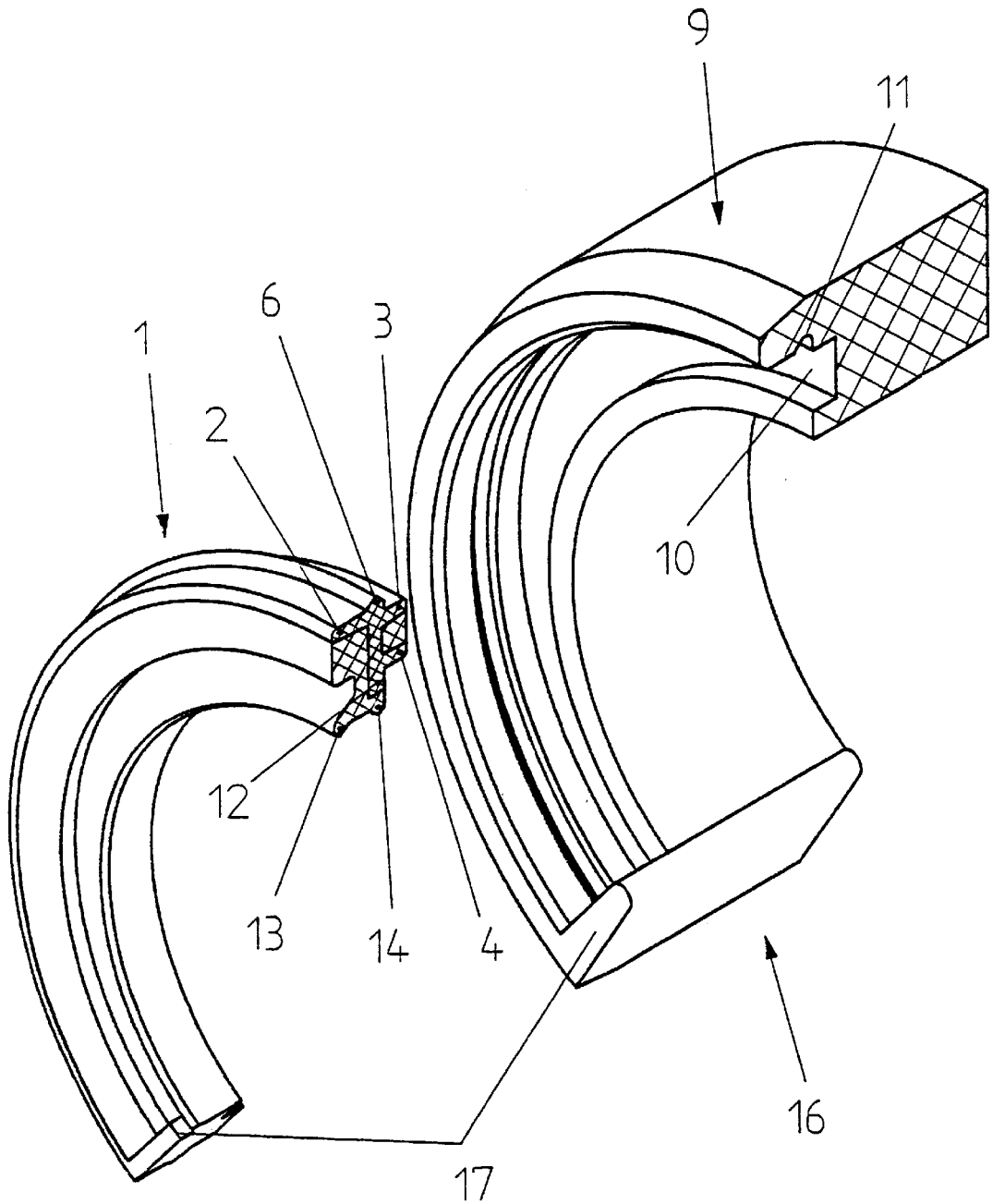
FIG. 3 is an exploded view of a portion of a contact radial seal and open linear ball bearing prior to assembly in accordance with another embodiment of the present invention.
Figure 4:
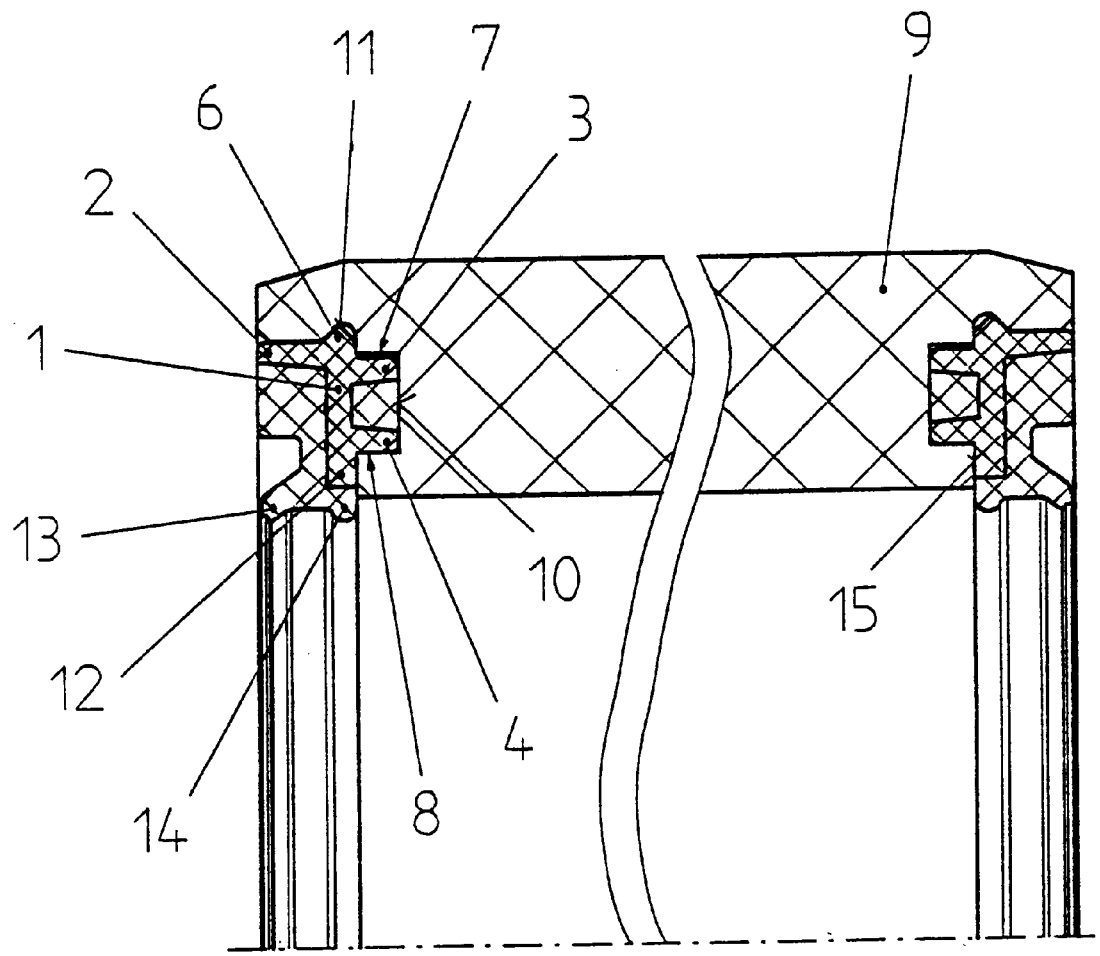
FIG. 4 is a cross-sectional view of a portion of the contact radial seal and open linear ball bearing shown in FIG. 3 after assembly.

In accordance with another embodiment of the present invention shown in FIGS. 3 and 4, the radial seal for use in an open linear ball bearing is defined by two parts. One part is comprised of an arcuate disk portion 1 provided with axially extending arcuate projections 2, 3, 4 similar to those shown in the embodiment of FIGS. 1 and 2. The projections 2, 3, 4 each possess different radii of curvature or different diameters. As in the case of the embodiment described above, the disk portion 1 projects radially outwardly beyond the projections 2, 3 disposed on one side of the disk center to form a retaining projection 6. This retaining projection 6 thus extends radially outwardly.

The projections 3, 4 on the securing side of the radial seal are also provided with respective circumferential faces 7, 8 that diverge slightly outwardly in a conical shape in the direction extending away from the disk portion 1 in a manner similar to that described above. After assembly of the radial seal into the outer ring 9, the diverging circumferential faces 7, 8 project with a radial retention force into the groove 10 that is provided on the front face of the outer ring 9 of the linear ball bearing. Also, the retention projection 6 is fixed in the annular groove 11 of the outer ring 9.

The other part of the radial seal shown in FIGS. 3 and 4 is formed of a low-friction sealing material and is provided with two sealing lips 13, 14. These sealing lips 13, 14 formed of a low-friction material are molded to the radial inside edge 12 of the disk portion 1 with a preload and are designed to rest on the shaft. The low-friction sealing material fills the space between the annular projection 2 and the radial inside edge 12 of the disk portion 1 as well as the inside space between the projections 3, 4. The low-friction sealing material that fills the inside space between the projections 3, 4 helps ensure a reliable seal between the front face 15 of the outer ring 9 and the actual radial seal.

The low-friction material from which the sealing lips 13, 14 are fabricated and which fills the space between the projections 3, 4 preferably has a higher elasticity than the part of the radial seal defining the disk portion 1 and the projections 2, 3, 4. The low-friction material from which the sealing lips 13, 14 are fabricated and which fills the space between the projections 3, 4 can be, for example, polyurethane or thermoplastic elastomer (TPE), and can be injected. To facilitate better adhesion of the injected material, axial openings or bores can be provided in the disk portion 1. This would allow the injected material to project into or extend through such axial openings or bores in the disk portion 1.

As mentioned above, this contact radial seal of the present invention is designed for open linear ball bearings. For this reason, the outer ring 9, which has been provided with an axially extending slit 16, is provided at the edges of the slit with radially oriented stop beads 17, between which the radial seal extends. Also, the radial seal is formed so that the disk portion 1, the axially extending projections 2, 3, 4 and the sealing lips 13, 14 are shaped as partial segments of a circle.

Figure 6:
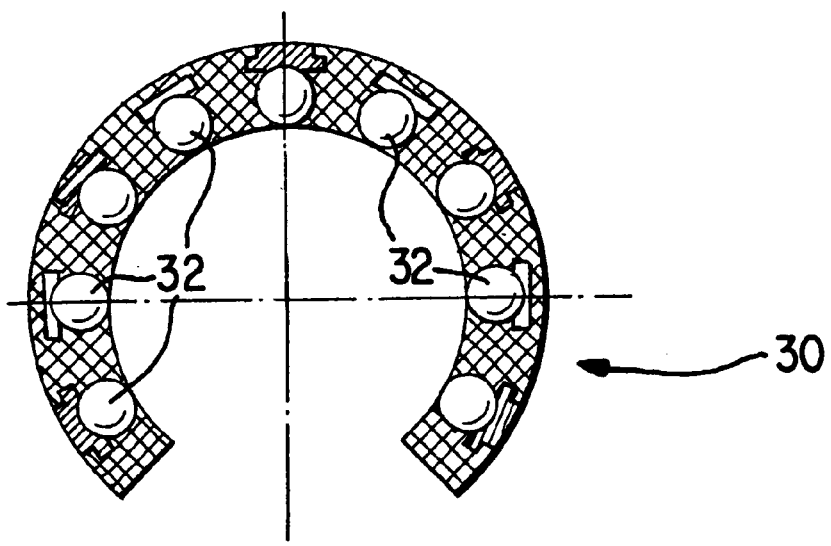
FIG. 6 is a cross-sectional view of an example of an open linear ball bearing with which the radial seal of the present invention can be utilized.

FIG. 6 illustrates an example of an open linear bearing 30 with which the seal shown in FIGS. 3 and 4 can be utilized. FIG. 6 depicts the linear arrangement of roller elements or balls 32 within the outer ring.

It is, of course, possible to use a seal similar to that shown in FIGS. 1 and 2 in an open bearing and to use a seal similar to that shown in FIGS. 3 and 4 in a closed bearing, taking into account the differences in construction between the two bearings.

It can thus be seen that the present invention provides a radial seal, useful in linear ball bearings, that is able to effect a reliable seat for the radial seal. The radial seal is thus not susceptible to becoming dislodged from the groove in the outer bearing during transportation or operation.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A linear ball bearing comprising:
   an outer ring and a plurality of roller elements, said outer ring having an axially facing end face provided with a seal receiving groove; and
   a radial seal positioned within the seal receiving groove in the outer ring, the radial seal having an axial center, the radial seal including an annular disk portion having opposite sides, a first arcuate projection provided on one side of the disk portion, a second arcuate projection provided on the opposite side of the disk portion, and a third arcuate projection provided on said one side of the disk portion, at least one of said first, second and third projections being axially oriented, each of said first, second and third projections being located at different radial distances from said axial center.

2. The linear ball bearing according to claim 1, wherein one wall defining the seal receiving groove in the outer ring is provided with a further groove, the disk portion including a radially outwardly extending retaining projection that is received in said further groove.

3. The linear ball bearing according to claim 2, wherein said disk portion extends radially outwardly of the first and second projections to form the retaining projection.

4. The linear ball bearing according to claim 1, including a fourth axially extending arcuate projection provided on the opposite side of the disk portion.

5. The linear ball bearing according to claim 4, wherein said first and third projections possess circumferential faces facing away from one another and diverging away from one another along a direction extending away from the disk portion.

6. The linear ball bearing according to claim 4, wherein said fourth projection is located at a different radial distance from said axial center as compared to said first, second and third projections.

7. The linear ball bearing according to claim 4, wherein said second projection is located radially outwardly of said first, third and fourth projections, and said first and third projections are located radially outwardly of said fourth projection.

8. A radial seal positionable in a groove in a linear ball bearing mounted on a shaft, comprising:
   an annular disk portion having a centrally located through hole and opposite sides, one side of the disk portion being provided with only two axially extending arcuate projections including a first axially extending arcuate projection and a second axially extending arcuate projection, the opposite side of the disk portion being provided with only two axially extending arcuate projections including a third axially extending arcuate projection and a fourth axially extending arcuate projection, the first and second projections on said one side of the disk portion being positioned radially outwardly of the fourth projection and radially inwardly of the third projection.

9. The radial seal according to claim 8, wherein the disk portion includes a radially outwardly extending retaining projection that is adapted to be received in a further groove formed in the linear ball bearing.

10. The radial seal according to claim 8, wherein said first and second projections possess circumferential faces facing away from one another and diverging away from one another along a direction extending away from the disk portion.

11. A radial seal positionable in a groove in a linear ball bearing mounted on a shaft, comprising:
    an annular disk portion having one side and an opposite side, said disk portion possessing a centrally located through hole and an axial center, two arcuate projections extending axially from said one side of the disk portion, the two projections being spaced apart so that one of the projections is located radially outwardly of the other projection, each of the two projections having a circumferential face, the circumferential faces of the two projections facing away from one another and diverging away from one another along a direction extending away from the disk portion.

12. The radial seal according to claim 11, including an axially extending arcuate projection provided on said opposite side of the disk portion, said projection on said opposite side of the disk portion being located radially outwardly of said two projections provided on said one side of the disk portion.

13. The radial seal according to claim 12, wherein the disk portion extends radially outwardly of said projection on said opposite side of the disk portion to define a radially extending retaining projection.

14. A linear ball bearing comprising:
    an outer ring and a plurality of roller elements, said outer ring being provided with a seal receiving groove, said seal receiving groove having a bottom wall; and
    a radial seal positioned within the seal receiving groove in the outer ring, the radial seal including an annular disk portion having first and second oppositely located and axially facing sides, the first side facing towards the bottom wall of the seal receiving groove and the second side facing away from the bottom wall of the seal receiving groove, a first arcuate projection provided on said first side of the disk portion and a second arcuate projection provided on said first side of the disk portion, said first and second projections possessing circumferential faces that face away from one another, said first and second projections projecting with a radial retention force into the seal receiving groove as a result of the circumferential faces of the first and second projections both diverging away from one another along a direction extending away from the disk portion prior to placement into the seal receiving groove.

15. The linear ball bearing according to claim 14, wherein one wall defining the seal receiving groove in the outer ring is provided with a further groove, the disk portion including a radially outwardly extending retaining projection that is received in said further groove.

16. The linear ball bearing according to claim 14, including a third arcuate projection provided on said second side of the disk portion and a fourth arcuate projection provided on said second side of the disk portion.

17. The linear ball bearing according to claim 16, wherein said first, second, third and fourth projections are located at different radial distances from an axial center of the radial seal.

18. The linear ball bearing according to claim 16, wherein said third projection is located radially outwardly of said first, second and fourth projections, and said first and second projections are located radially outwardly of said fourth projection.

19. The linear ball bearing according to claim 1, wherein said disk portion includes a radial inside edge provided with at least one sealing lip, said at least one sealing lip being positioned radially inwardly of the first, second and third projections.

20. The linear ball bearing according to claim 1, wherein said disk portion includes a radial inside edge provided with a pair of spaced apart sealing lips.

21. The linear ball bearing according to claim 19, wherein said at least one sealing lip is made of a material having a higher elasticity as compared to the material from which the first, second and third projections are made.

22. The radial seal according to claim 11, wherein said two projections constitute a first projection and a second projection, the radial seal including a third projection extending axially from said opposite side of the disk portion and a fourth projection extending axially from said opposite side of the disk portion, each of said first, second, third and fourth projections being positioned at different radial distances from the axial center of the disk portion, said first and second projections being positioned radially inwardly of the third projection and radially outwardly of the fourth projection, and a retaining projection provided on an outer circumferential part of the disk portion and extending radially outwardly for being seated in a further groove formed in the linear ball bearing.

23. The radial seal according to claim 11, wherein said two projections constitute a first projection and a second projection, the radial seal including a third projection extending axially from said opposite side of the disk portion, each of said first, second and third projections being positioned at different radial distances from the axial center of the disk portion, said first and second projections being positioned radially inwardly of the third projection, said disk portion including a radial inside edge provided with at least one sealing lip that extends radially inwardly, the sealing lip being made of a material having greater elasticity than the material from which the first, second and third projections are made.

24. The radial seal according to claim 23, wherein the material from which the at least one sealing lip is made also fills a space existing between the first and second projections.

25. A radial seal positionable in a groove in a linear ball bearing mounted on a shaft, comprising:

an annular disk portion having one side and an opposite side, said disk portion possessing a centrally located through hole and an axial center, a first arcuate projection extending axially from said one side of the disk portion, a second arcuate projection extending axially from said one side of the disk portion, a third arcuate projection extending axially from said opposite side of the disk portion, the first and second projections being spaced apart with the first projections being located radially outwardly of the second projection, said first, second and third projections being positioned at different radial distances from the axial center of the disk portion, said disk portion having a radial inside edge provided with at least one radially inwardly extending sealing lip, the sealing lip being made of a material having greater elasticity than the material from which the first, second and third projections are made.

26. The radial seal according to claim 25, wherein the material from which the at least one sealing lip is made also fills a space existing between the first and second projections.

\* \* \* \* \*